H. S. BECKMAN.
MOTION PICTURE ACTUATING MEANS.
APPLICATION FILED AUG. 17, 1917.
1,301,357.
Patented Apr. 22, 1919.
2 SHEETS—SHEET 1.
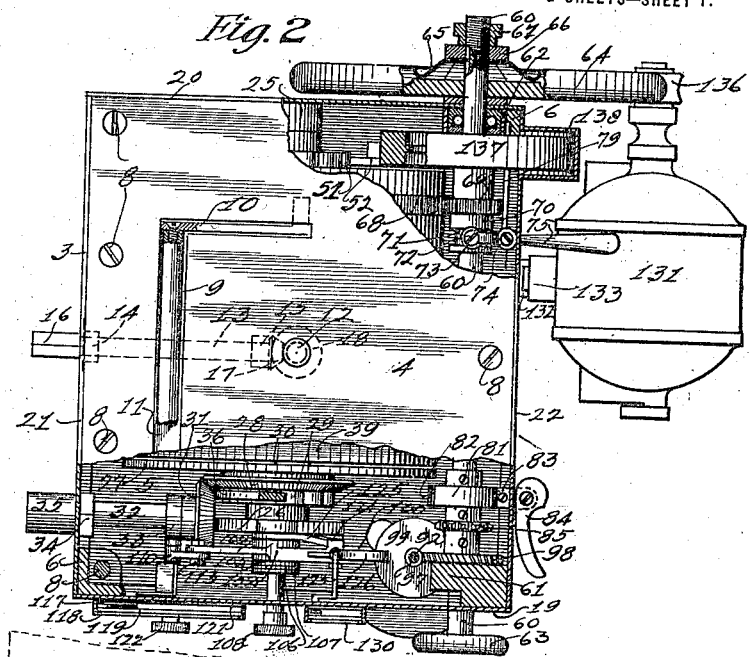
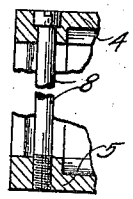
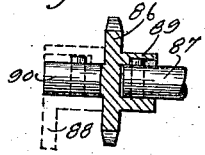
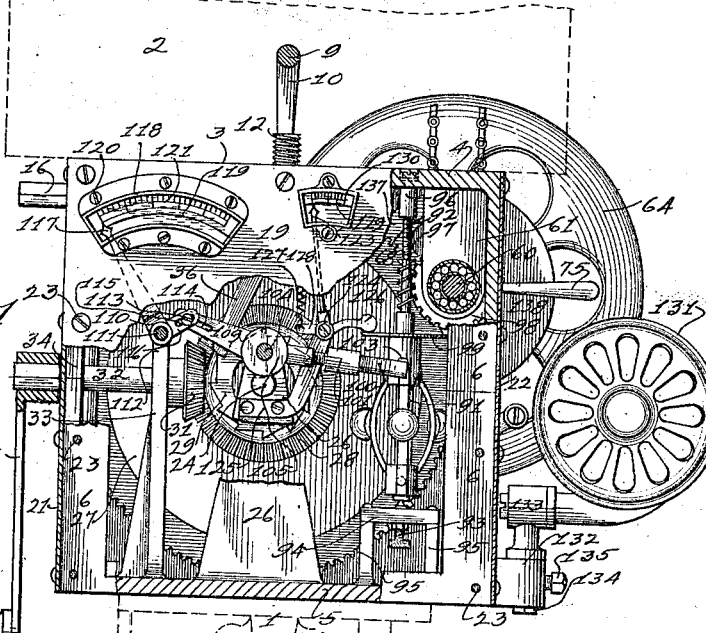
Witnesses,
C. O. Albright
W. F. Erwin
Inventor,
Herbert S. Beckman
By Arthur Mead
Attorney H. S. BECKMAN.
MOTION PICTURE ACTUATING MEANS.
APPLICATION FILED AUG. 17, 1917.
1,301,357.
Patented Apr. 22, 1919.
2 SHEETS—SHEET 2.
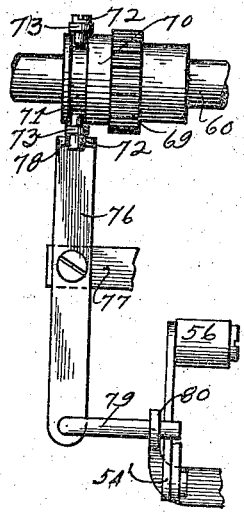
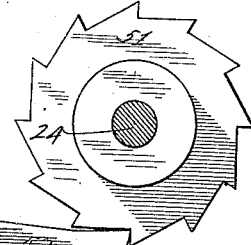
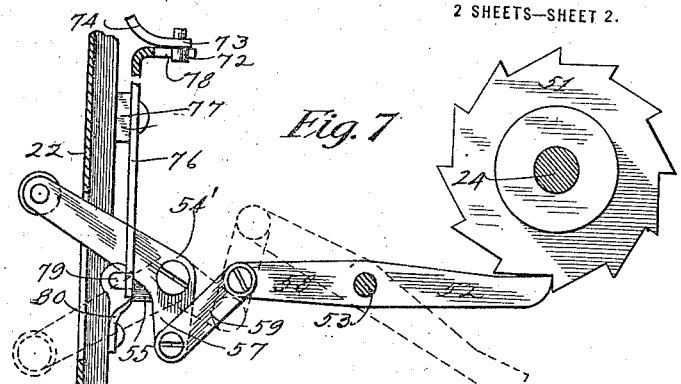
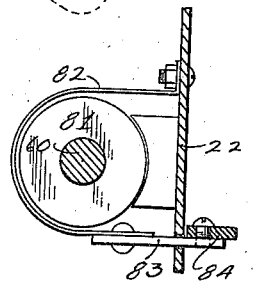
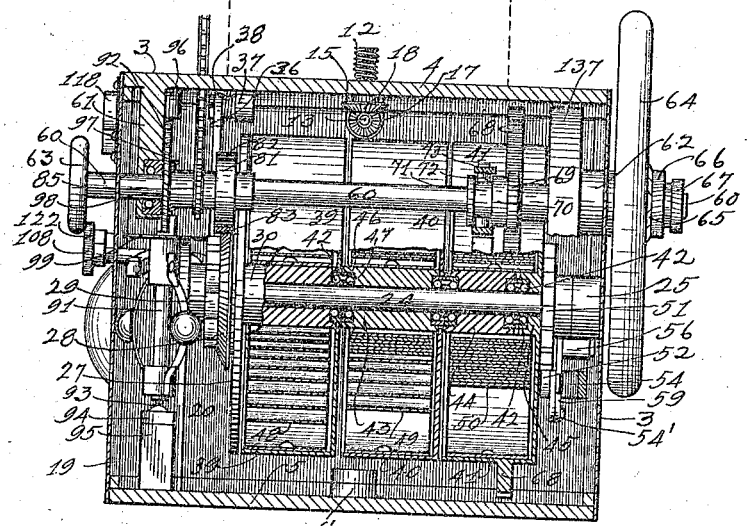
Witnesses
C. O. Albright
W. T. Elwin
INVENTOR,
Herbert S. Beckman
By Arthur L. Mack
attorney

UNITED STATES PATENT OFFICE.

HERBERT S. BECKMAN, OF LOS ANGELES, CALIFORNIA.

MOTION-PICTURE-ACTUATING MEANS.

1,301,357.  Specification of Letters Patent. Patented Apr. 22, 1919.

Application filed August 17, 1917. Serial No. 187,718.

*To all whom it may concern:*

Be it known that I, HERBERT S. BECKMAN, a citizen of the United States, residing at Los Angeles, in the county of Los Angeles and State of California, have invented certain new and useful Improvements in Motion-Picture Actuating Means, of which the following is a specification.

My invention relates to camera motors and the like which may be employed for operating motion picture cameras and has for an object the provision of a device capable of attachment to any common type of motion picture camera for rendering the operation of the camera uniform and regular to an extent not generally possible with manually operated machines of this character.

The operation of the motion picture camera has become a science with use and an operator is required to possess more than a mere skill in turning the crank of the machine by hand, elaborate light effects being greatly employed in the art, thus requiring more art than mechanical skill on the part of the operator. It is an object, therefore, of this invention to provide an adequate and dependable means for performing the mechanical features of motion photography, adaptable to most all conditions which may be encountered in the field of usefulness, so that the operator may lend his entire attention to the artistic effects.

I am aware that inventions have heretofore been made and patented for accomplishing the above results in a general way, but in an attempt to adapt such inventions to practical use, the devices have usually been found to be independable and to require a great amount of attention during operation, thus defeating the very objects of their invention. The electric motor, for instance, has been heretofore employed but has been found to be incapable of use without some means of providing a uniform speed under all conditions and regardless of the speed of the motor, rheostatic control being generally resorted to for this purpose. It is an object of this invention to provide means whereby the operation of the camera, whether by hand, mechanical or electric motor, may be effected at a predetermined speed and uniformly at any speed.

It is a further object to provide in addition to the usual hand operated means, a mechanical and an electric motor having common driving connection with the camera crank shaft so that either means may be employed selectively without removing the other.

A further object is to provide means whereby the power from the electric motor to the driven elements of the camera may be applied in such a manner as to insure a uniform speed of the driven elements regardless of the varying speed of the motor.

A further object is to provide improved winding means for the mechanical motor and starting and stopping means associated therewith.

A further object is to provide a mechanical motor of the spring type capable of running out a maximum length of film at a single winding.

A further object is to provide a sensitive speed indicating means together with means for indicating any slight variation in speed, these elements being adjustable and capable of being set to any desired point for predetermining the speed of the camera. Other objects will appear as the description of my invention progresses.

I attain the above objects by means of the device disclosed in the annexed drawings in which Figure 1 is an end elevation of the entire camera actuating means, with the case partly broken away at points, for clarity of illustration. Fig. 2 is a plan of the same, partly in section. Fig. 3 is a fragmentary sectional elevation of the case showing the manner of attaching the top and bottom portions thereof together. Fig. 4 is a section of the camera driving attachment, and Fig. 5 is an end view thereof.

Fig. 6 is a transverse sectional elevation of the same. Fig. 7 is an enlarged elevation of the mechanical motor locking means, and Fig. 8 is a side elevation thereof. Fig. 9 is an end view of the countershaft brake means.

Throughout the specifications and the several views of the drawings, similar characters of reference are employed for indicating the same or like parts, such parts being arranged in the drawings in their preferred form and combining to produce the objects of this invention as hereinbefore set forth and the details of which I will now describe.

It is desirable, in a device for this purpose, to arrange the camera actuating means in immediate contact with the camera, and as the weight of the means disclosed is a considerable factor and in order to provide as compact an apparatus as possible, I prefer to attach my actuating means directly to the tripod table 1, to which the camera 2 is usually attached, the latter being superimposed upon the case or housing 3 of the actuating means or motor, as shown in Fig. 1. The motor case 3 is composed of a cast top portion 4 and a somewhat similar bottom portion 5, and legs 6 of angular cross section are cast integral with the members 4 and 5 so as to contact at points in the plane of the center of the case when the two members are held together.

The bottom case member 5 has a boss 6' into which an ordinary tripod screw 7 may be screwed, as in the case of the camera. Elongated screws or bolts 8 are extended through the top member 4 and the lower ends thereof are threaded into or otherwise secured to the bottom member 5 for holding the case frame together, any suitable number of these screws being used, as may be found necessary or expedient. The top member 4 has a handle 9 pivoted thereto by means of arms 10 and the handle and arms are adapted to rest in a suitable recess 11 in the top surface of the member 4 when not extended for use, this handle serving as a means for transporting the motor from place to place.

A screw 12 pivotally held in the top of the member 4 of the case is adapted to be threaded into the bottom of the camera 2 for holding the camera in position upon the motor case and this screw may be operated by means of a transverse rod 13 suitably journaled in bearings 14 and 15 formed on member 4 and having a squared end 16 outside of the case which may receive a crank such as is usually employed in the operation of the camera by hand. The rod 13 carries a small bevel pinion gear 17 which meshes with and turns a larger bevel gear 18 carried on the lower end of the screw 12 within the motor case, as shown in Figs. 1 and 2.

The operating mechanism of the motor is inclosed by means of end plates 19 and 20 and side plates 21 and 22, of very thin metal, which are held in place by means of screws 23 secured in the legs 6. The case is substantially rectangular in form and at a point about the center thereof I provide a mandrel 24 which is journaled in a bearing 25 at the rear of the case and a lug 26 at the front thereof, both of which are extended from the bottom frame member 5 of the case and are integral therewith. Loosely mounted upon the mandrel 24 near the front end I provide a disk 27, to the front side of which is suitably attached a relatively large bevel gear 28 by any suitable means and a ratchet 29, and the rear side of the disk having a rearwardly extended hub 30.

A small bevel pinion 31 is carried on the inner end of a transverse shaft 32 which is journaled in bearings 33 and 34 formed on the lower case member 5, the outer end of shaft 32 being squared to receive a crank 35, and the pinion 31 meshing with the bevel gear 28. The ratchet 29 is engaged by a pawl 36 pivotally held at the top of the case on a lug 37 and maintained in engagement with the ratchet by means of a spring 38, the turning of the crank shaft 32 serving to turn the disk 27 and the pawl serving to hold the same against motion in a reverse direction.

A plurality of drums 39, 40 and 41 (three being shown in the drawings) are loosely mounted on the mandrel 24 with ball bearings 42 inserted over the mandrel and within the hubs 43, 44 and 45, respectively. Each of the ball bearings has a retainer 46 threaded into the hub of its respective drum, and the bearings are arranged in pairs, the set of balls in one of the hubs being spaced from the set in the adjacent hub by means of a spacer ring 47. The mandrel bearings 25 and 26 also have ball bearings of a similar character with retainers threaded into the bearings so that by advancing the retainers in one of these bearings in the direction of the center of the case, all of the drums will be forced into their proper spaced relation and the balls of each set of bearings into contact with the spacer rings on the mandrel.

Each of the drums has a substantially wide rim and a web extending to the hub, and the hub of the forward drum extends rearwardly into the next drum in line, and likewise, the hub of the center drum extends into the third drum, as shown in Fig. 6. Each of the drums carries a flat coil spring, as at 48, 49 and 50, the inner end of the spring 48 being secured to the hub 30 of the disk 27 and the outer end being secured to the inner side of the rim of drum 39. Hub 43 of drum 39 is secured to the inner end of spring 49 and the outer end of this spring is secured to the rim of drum 40. Likewise, the inner end of spring 50 is attached to hub 44 and the outer end thereof to the rim of drum 41. Thus the springs are connected in tandem with disk 27, so that when tightly wound by means of the crank 35, a prolonged operation of the spring motor may be effected.

The rear side of the drum 41 carries a ratchet 51 which is adapted to be engaged by a pawl 52 pivoted at 53 to a suitable bracket 54 attached to the case member 5, for holding the drums against rotation in one direction, while the forward ratchet holds the same against movement in a reverse direction, for preserving the tension of the coil springs within the several drums.

When it is desired to operate the motor it is necessary to release the ratchet 51, and for this purpose I provide a bell crank 54' which is pivoted to a bracket 55 attached to the frame member 5, this lever having a handle 56 on its outer end and the inner arm 57 thereof being pivotally connected with the end 58 of the pawl 52 by means of a link 59, as shown in Fig. 7. The movement of the lever 54' into the position shown in broken lines in Fig. 7, thus serves to release the ratchet 51 from the pawl 52 and permits the rotation of the drums and the consequent unwinding of the springs 48, 49 and 50, in succession.

A longitudinally disposed countershaft 60 is provided in the upper portion of the case and is journaled in suitable bearings 61 and 62 formed on the upper case member 4 and may have ball bearings such as are shown in connection with mandrel 24. The forward and rear ends of this shaft are extended outwardly from the case for a suitable distance and carry, respectively, a small hand wheel 63 and a relatively large wheel 64, the wheel 63 being screwed on the end of the shaft for rotation therewith and wheel 64 being loosely mounted thereon but frictionally held for rotation therewith by means of a pressed steel spring 65 of cup formation keyed to and for positive rotation with the shaft. Nuts 66 and 67 attached to the end of the shaft serve to hold the cup spring 65 in frictional contact with wheel 64, for purposes hereinafter described.

Motion is communicated to shaft 60 by means of a large gear 68 either formed on or attached to drum 41 and which meshes with and drives a small pinion 69 held on shaft 60, the ratio between gears 68 and 69 being as great as possible in order that a maximum speed may be imparted to shaft 60. The forward hub 70 of pinion 69 has an annular groove 71 which is engaged by pins 72 attached to the ends 73 of a yoke 74, and this yoke is pivotally supported on a suitable bracket or lug on the upper case member 4, a handle 75 being provided on the outer end thereof by means of which the pinion 69 may be moved longitudinally of shaft 60 for engagement and disengagement with gear 68.

A vertical lever 76 is pivotally attached to a bracket 77 extended from the case and the upper end has a slot 78 which is engaged by pin 72 in the lower end of the yoke 74 and is thus moved on its fulcrum as the pinion 69 is shifted. The lower end of lever 76 carries a longitudinally disposed pin 79 which is slidably held at its other end in a bracket 80 of the case and engages the lower side of the bell crank 54 and thus serves to lock the bell crank against movement when the pinion is disengaged from gear 68.

At a point near the forward end of shaft 60 and within the case I provide a brake drum or collar 81, suitably secured to or formed on the shaft, which is adapted to be engaged at will by a resilient brake band 82, the upper end of which is attached to the side of the case and the lower end thereof to a sliding arm 83 extending through the side of the case. A cam lever 84 is pivotally attached to the outer end of arm 83 in such a manner that when the cam lever is moved outwardly from the position shown in Fig. 2, the band 82 will frictionally engage the collar 81 and slow down or completely stop the rotation of shaft 60, as may be necessary, according to the extent of movement of the lever. This latter device facilitates the stopping of the machine when occasion demands and prevents damage to the mechanism from impact when the ratchets are engaged by the pawls.

Motion is communicated to the camera 2 by means of a sprocket 85 secured to shaft 60, a similiar sprocket 86 removably attachable to the camera crank shaft 87 and a suitable chain connecting these sprockets for operation. The outer end of the camera crank shaft is usually slotted or keyed to receive the camera crank 88 and I provide the hub 89 of sprocket 86 with a corresponding key or slot, as the case may be, so that it may be slipped on the end of the camera crank shaft in lieu of the usual crank 88. The outer hub 90 of sprocket 86 is reduced to conform to the bore of the crank 88 and may be provided with a key or slot such as is provided on crank shaft 87, so that the camera crank may be used on the camera in connection with the automatic driving means, if necessary.

The governor and regulating means employed in my improved motor somewhat resembles in form and character that of an ordinary phonograph and needs but little description. The governor proper is of the ordinary three ball type and has a vertical shaft 91 with adjustable pivot screws 92 and 93 at the top and bottom respectively, for adjusting the thrust of the shaft. The lower screw 93 is adjustably held in a block 94 attached to a pair of lugs 95 formed on the bottom case member 5, and the upper screw is threaded into a lug 96 on the top member 4. The upper end of the governor shaft 91 is provided with a screw 97 which meshes with and is driven by a worm wheel or gear 98 held on shaft 60, thus causing a downward movement of the disk 99 when the worm and shaft 91 are in operation, to correspond in extent, to the speed of shaft 60.

The movement of the governor disk 99 is limited downwardly by means of a yoke 100 which is threaded on to the end of an arm 101 of a lever 102, and the ends of the yoke are provided with contact points 103 for engagement with opposite points on the lower surface of the disk. The lever 102 is pivotally held on a screw 104 secured in the upper end of the front bearing lug 26 of the case and has a substantially enlarged hub portion 105 against the forward side of which a friction element or disk 106 of fiber or like material is frictionally held by means of an enlargement 107 formed on the screw 104, the outer end of the screw being extended outwardly from the front end of the case and provided with a knurled thumb piece 108 by means of which the screw may be turned for regulating the friction between the lever hub and the element 106, for holding the yoke 100 on the end of the lever at a desired position beneath the governor disk 99.

Lever 102 has an arm 109 which is adjustably connected with a bell crank 110—the latter being pivotally held on a screw 111 secured in an extension 112 from the crank shaft bearing 33 of the case—by means of a screw or bolt 113 extending through slots 114 and 115, respectively, in arms 109 and 116. An indicator or pointer 117 is attached to the bell crank 110 and extends substantially at right angles to the arm 116 thereon, the upper end thereof being bent forwardly and outwardly through a suitable aperture in the upper portion of the front end plate of the case. An indicator housing 118 is provided for inclosing the indicator 117 and a glass 119 may be provided in the front thereof so as to render the operation of the pointer visible at all times, housing 118 being secured to the case by means of screws 120 and a graduated scale 121 representing feet of film per minute or revolutions of the camera crank shaft per minute are provided within the housing behind the pointer. The screw 111 of bell crank 110 is extended through the front end of the case and is provided with a thumb piece 122 by means of which the pointer may be moved to a desired point in front of the scale 121 for setting the regulator yoke 100 at a desired position beneath the governor disk 99, for limiting the speed of the camera to a desired degree.

When the pointer 117 is thus set, together with the yoke 100, the screw 104 may be turned so as to increase the friction between the hub of lever 102 and the friction element 106 for holding the yoke at the proper place until a further change is necessary. The adjustment of the leverage between levers 102 and 110 may be changed by movement of the pivot screw 113. Thus the speed of the motor may be set and limited to any desired point to conform to a desired speed of the camera.

As a means for ascertaining at any time the uniformity of operation of the camera, or the motor, and for registering any slight variation of speed, I provide a needle pointer 123 which is attached to a lever 124 pivotally held on the end of an arm 125 extending from and attached to the front mandrel bearing 33. Arm 126 of lever 124 is held in resilient engagement with the upper side of the governor disk 99 by means of a spring 127 which is attached at its lower end to an arm 128 of the lever and at its upper end to a suitable portion of the case. Thus, as the disk 99 moves vertically on the governor shaft, the arm 126 of lever 124 is moved correspondingly and the needle 123 is also moved backwardly or forwardly over the surface of a relatively short and curved scale 129 attached to the outside of the case. The needle and scale are inclosed in a suitable housing 130 screwed to the side of the case and the needle is bent outwardly and is extended through the case, as shown in Fig. 2. It will be apparent that the movement of the needle will correspond exactly to that of the governor disk, and thus any variation of the position of the governor disk will be registered by the needle.

It will be understood that while my improved spring motor, which I have completely described, is capable of running out a length of film equal to that usually required for ordinary purposes, yet there are times when a greater length of film may be necessary in the production of certain scenes, and for this purpose, the capabilities of a spring motor being limited because of excessive weight and general unwieldiness, I provide means on the exterior of the spring motor case for supporting a small electric motor 131, which consists in a lug 132 formed on the bottom case member 5 and a bracket 133 having a square stem 134 adapted to be held in the lug 132 by means of a set screw 135. The upper end of the bracket receives a suitable stem attached to the motor and is rigidly secured to the stem in any suitable manner.

The motor 131 is provided with a small driving pulley 136 which is adapted to engage and drive the large wheel 64 on shaft 60 when the gears 68 and 69 are out of mesh, and the camera may thus be operated directly from the motor 131 without in any way affecting the spring motor.

The wheel 64, ordinarily may be carried with the motor as an accessory, inasmuch as a smaller fly wheel 137 is provided on the interior of the case on shaft 60 for use particularly with the spring motor, an extension 138 being provided in one side of the case to accommodate the fly wheel. The electric motor may also be detached from the case when not needed.

In operation, the springs being wound by means of the crank provided and hereinbefore described may be held in tension and in readiness for use by means of the engagement of the rear pawl 52 with ratchet 51. The motor may be started by releasing the pawl 52 from the ratchet, after having first meshed the gears 68 and 69 and released the brake 82 from its collar or drum 81. The governor yoke or speed regulator 100 having been set at a desired point as indicated by the position of the indicator 117, the disk 99 of the governor may move downwardly only into contact with the points of the yoke and the speed of the camera and entire mechanism will thus be established and the variation, if any, from the normal will be indicated by the needle 123.

The same result may be accomplished by connecting the electric motor 131 in the manner described, provided that the gears 68 and 69 are first disengaged, or, if in some cases it may be desirable to turn the camera by hand the usual crank provided for this purpose may be employed and the speed and variation of speed will be registered in the same manner as when operated by either the mechanical or electric motors. The operation of the camera may be stopped or slowed down at any point by the use of the brake 82, or the rear ratchet and pawl 51 and 52, and the latter may be locked in their proper relation by means of the device described in order that the sudden starting or stopping may be prevented and damage will thus be averted to the operating mechanism.

The combined mechanical and electric actuating means described provides an elastic and thoroughly efficient means for operating the camera under all conditions and thereby increases the range of usefulness of the invention and eliminates much of the manual effort usually required and practically all of the lack of uniformity in operation.

Having thus described my invention, what I claim as new and desire Letters Patent for, is:

1. A camera actuating mechanism comprising a housing removably attachable to a camera, a spring motor housed therein and capable of being detachably connected with said camera, winding means therefor, a driven shaft in said housing, gearing connecting said motor and said shaft, means for disconnecting said gearing at will, a governor for regulating the speed of said motor, an electric motor supported exterior of said housing, and means carried by said driven shaft for connection with said electric motor, for operating said gearing, at will in lieu of said spring motor.

2. A camera actuating mechanism comprising a housing removably attachable to a motion picture camera at will, a spring motor housed therein for operating said camera, governor means for regulating the operation thereof, means on said housing for visibly indicating the speed of said motor and said camera, supplementary indicating means connected with said governor for visibly indicating any variation of the speed of said camera, means for locking said motor against action at will, and supplementary driving means exterior of said housing for operating said camera when said spring motor is locked against action.

3. A camera actuating mechanism comprising a pair of separate and commonly mounted driving units removably and selectively attachable to a camera at will, a common driven element therefor, a governor operated by said driven element for regulating the speed of said camera, manually controlled means for regulating said governor, visible indicating means for indicating the speed thereof, visible means for indicating any variation of speed of said governor from a set speed, and means for operatively connecting said driving units with said governor.

4. A camera actuating mechanism comprising a mechanical and an electrical driving unit commonly supported for operation and adapted to be connected selectively with a camera, coöperating means for regulating and indicating the speed of the camera and any variation of speed thereof from that desired, manually operable brake means for limiting the speed of said camera, a common driven element operable by both of said driving units, means for locking said mechanical unit against operation at will, means for rendering said driven element inoperative, at will, and gearing connecting said mechanical and electrical driving units for selectively operating said driven element.

5. A camera actuating mechanism comprising a housing, a mechanical driving unit therein, a driven element also therein, an electrical driving unit supported on and exterior of said housing, gearing for connecting said driving units with said driven element, means for disconnecting said driving units therefrom at will, means operable by said driven element for driving connection with a camera actuating shaft, locking means for said mechanical driving unit, and means for automatically regulating the operation of said driven element.

6. A camera actuating mechanism comprising a housing, mechanical and electrical driving units supported thereon, means for pivotally supporting said electrical unit a driven element common to both of said driving elements, locking means for said mechanical driving element, gearing for connecting both of said driving elements with said driven element, separate means whereby said driving units may be disconnected from said driven element, camera driving means operable by said driven element, a drum carried by said driven element, and a manually operable brake band for frictional contact with said drum and operable from the exterior of said housing, for regulating the operation of said driven element.

7. A camera actuating mechanism including a housing, coöperating mechanical and electrical driving means carried thereby, means for pivotally moving said electrical driving means for rendering said mechanism inoperative thereby, a driven element common to both of said driving elements, means for connecting and disconnecting said mechanical driving unit from said driven element, at will, for selective operation, speed regulating and indicating means for said driven element, locking means for said mechanical unit, manually operable brake means on and for regulating the speed of said driven element, and means operable by said driven element for actuating the camera.

8. In a device of the character referred to, in combination, a housing, a spring motor within the housing, an electric motor detachably supported on the exterior of the housing, a driven element operably connected to a camera actuating shaft, gearing for connecting said motors with said driven element, means for selectively disconnecting said motors from said driven element, and means for rendering the spring motor inactive when the electric motor is in operation.

HERBERT S. BECKMAN.

Witnesses:
C. O. ALBRIGHT,
LUTHER L. MACK.

Copies of this patent may be obtained for five cents each, by addressing the "Commissioner of Patents, Washington, D. C."